United States Patent
Steele et al.

(12)

(10) Patent No.: US 9,154,926 B1
(45) Date of Patent: Oct. 6, 2015

(54) DELIVERY OF A MESSAGE BASED ON A STATUS OF A RECEIVING DEVICE

(71) Applicant: Sprint Communications Company L.P., Overland Park, KS (US)

(72) Inventors: Kenneth Ray Steele, Overland Park, KS (US); Sanjay K. Sharma, Olathe, KS (US); Jennifer M. Lewer Walter, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 201 days.

(21) Appl. No.: 13/741,866

(22) Filed: Jan. 15, 2013

(51) Int. Cl.
    *G06F 15/16* (2006.01)
    *H04W 4/12* (2009.01)
    *H04L 12/58* (2006.01)

(52) U.S. Cl.
    CPC .............. *H04W 4/12* (2013.01); *H04L 51/04* (2013.01); *H04L 51/14* (2013.01); *H04L 51/36* (2013.01)

(58) Field of Classification Search
    CPC ......... H04L 51/14; H04L 51/04; H04L 51/36; H04L 12/585; H04L 51/12; H04L 12/5895
    USPC ........... 709/200–206, 217–227, 228; 455/411
    See application file for complete search history.

(56) References Cited

U.S. PATENT DOCUMENTS

| | | | |
|---|---|---|---|
| 6,920,332 B2 | 7/2005 | Ala-Luukko | |
| 7,853,248 B2 * | 12/2010 | Harendra et al. | 455/418 |
| 8,160,545 B2 | 4/2012 | D'Englere | |
| 8,166,119 B2 * | 4/2012 | Ligh et al. | 709/206 |
| 8,315,597 B2 * | 11/2012 | Olincy et al. | 455/410 |
| 8,559,981 B2 * | 10/2013 | Tieman et al. | 455/456.4 |
| 8,706,824 B2 * | 4/2014 | Davenport et al. | 709/206 |
| 2007/0249374 A1 | 10/2007 | Hu et al. | |
| 2009/0271486 A1 * | 10/2009 | Ligh et al. | 709/206 |
| 2010/0227629 A1 | 9/2010 | Cook et al. | |
| 2013/0339453 A1 * | 12/2013 | Aggarwal et al. | 709/206 |
| 2014/0057610 A1 * | 2/2014 | Olincy et al. | 455/414.1 |
| 2014/0181231 A1 * | 6/2014 | Davenport et al. | 709/206 |

\* cited by examiner

*Primary Examiner* — Moustafa M Meky

(57) ABSTRACT

Embodiments disclosed herein provide systems and methods for delivery of a message based on a status of a receiving device. In a particular embodiment, a method provides, in a first wireless communication device, receiving first user input from a user indicating a message for transmission to a second wireless communication device. The method further provides receiving second user input from the user indicating that the message should not be delivered to the second wireless communication device when a status of the second wireless communication device satisfies a criteria. The method further provides transferring the message and an indication of the second user input to a wireless communication network, wherein, based on the indication of the second user input, the wireless communication network does not deliver the message to the second wireless communication device if the criteria is satisfied.

20 Claims, 7 Drawing Sheets

DELIVERY OF A MESSAGE BASED ON A STATUS OF A RECEIVING DEVICE

TECHNICAL BACKGROUND

In recent years, messaging between mobile devices has become ubiquitous. In addition to Short Message Service (SMS) text messages, wireless devices are now able to exchange picture, video, audio, and other types of data in messages via Multimedia Message Service (MMS), an instant messenger protocol, email, social networks, or many other types of messaging platforms. When a wireless device receives a message from another wireless device, a user of the receiving device typically manipulates a user interface in order to view the message. The user of the receiving device may not want to manipulate the user interface when the message is received. The user of the receiving device may apply filters to block messages or silence messaging alerts. For example, the user may turn off alerting mechanisms, such as tones and vibrations. The user may also instruct the network to block messages from particular senders.

Unfortunately, the sender of the message does not have an efficient or effective way to assist the receiving user in this task. The sender may select a time for delayed message delivery. The sender may also select a network for message delivery. In some cases, the sender may even track the location of the receiving device and manually control their messaging to the receiving device accordingly. The sender does not have an efficient or effective way to control the delivery of a message based on the status of the receiving device when they are sending the message.

Overview

Embodiments disclosed herein provide systems and methods for delivery of a message based on a status of a receiving device. In a particular embodiment, a method provides, in a first wireless communication device, receiving first user input from a user indicating a message for transmission to a second wireless communication device. The method further provides receiving second user input from the user indicating that the message should not be delivered to the second wireless communication device when a status of the second wireless communication device satisfies a criteria. The method further provides transferring the message and an indication of the second user input to a wireless communication network, wherein, based on the indication of the second user input, the wireless communication network does not deliver the message to the second wireless communication device if the criteria is satisfied.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
FIG. 1 illustrates a wireless communication system for delivery of a message based on a status of a receiving device.

FIG. 1 illustrates wireless communication system 100. Wireless communication system 100 includes wireless communication device 101, wireless communication device 102, and wireless communication network 103. Wireless communication device 101 and wireless communication network 103 communicate over wireless link 111. Wireless communication device 102 and wireless communication network 103 communicate over wireless link 112.

In operation, wireless device 101 is capable of sending messages to wireless device 102. The messages may include text, photo(s), audio, video, or any other type of data that may be included in a message between two wireless devices. While these messages may be exchanged between the two devices any time that wireless network 103 is available, there may be times when it would be unsafe, or otherwise undesirable, for a user of wireless device 102 to open the received message and view the message content. For example, the user of wireless device 102 may be driving a vehicle, attending a class, or in some other situation where the user of wireless device 101 would not want to interrupt the user of wireless device 102. Therefore, the user of wireless device 101 who is sending the message to wireless device 102, may not want the message delivered to wireless device 102 if it would be undesirable for the user of wireless device 102 to view the message.

Figure 2:
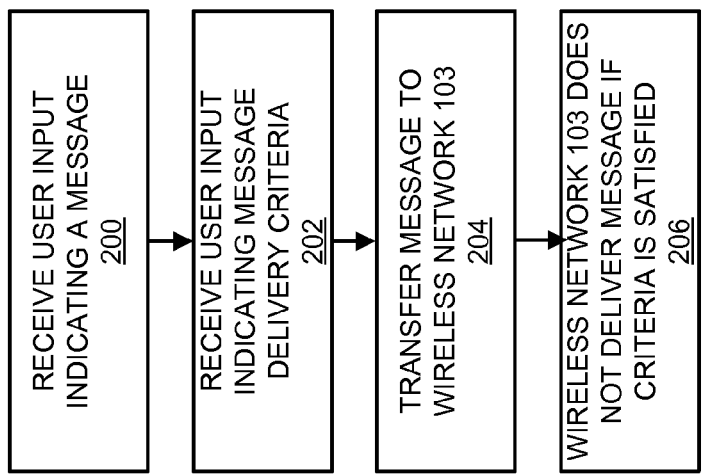
FIG. 2 illustrates an operation of the wireless communication system for delivery of a message based on a status of a receiving device.

FIG. 2 illustrates an operation of wireless communication system 100 for delivery of a message based on a status of a receiving device. Wireless device 101 receives first user input from a user indicating a message for transmission to wireless device 102 (step 200). The first user input may enter a text based message into wireless device 101, an audio message, a photo message, a video message, or some other type of data that can be sent over a messaging platform—including combinations thereof. The messaging platform may be Short Message Service (SMS), Multimedia Message Service (MMS), an instant message service, a social networking service, email, or any other platform that can be used for transferring messages between wireless devices. Likewise, the message may be entered into an application executing on wireless device 101 to provide the user of wireless device 101 with access to the messaging platform. The first user input may further include an indication of wireless device 102 as a destination for the message. The indication may be a phone number, username, network address, presentity, or any other type of identifier that would identify wireless device 102 and/or a user of wireless device 102.

Wireless device 101 also receives second user input from the user indicating that the message should not be delivered to wireless device 102 when a status of wireless device 102 satisfies a criteria (step 202). The second user input may be entered by the user as an option for the particular message in a messaging application, a preference for all messages sent from the messaging application, a preference for messages to particular recipients from the messaging application, a preference within the operating system of wireless device 101, or some other way of indicating the second user input to a wireless device. The second user input may be entered in response to a prompt from wireless device 101 asking whether the user would like to add criteria to the delivery of the message to wireless device 102. For example, after indicating that the message should be sent, wireless device 101 may provide an on screen prompt where the user can indicate whether any criteria should be placed on the message delivery and may also be able to indicate what that criteria should be. The status and criteria may apply to a speed in which wireless device 102 is traveling, a location(s) that wireless device 102 is in, a location(s) that wireless device 102 is not in, a time of day, a status entered by a user of wireless device 102, a status determined by wireless device 102 itself, such as the type of application(s) in use on wireless device 102, or any other criteria on the status of a wireless device—including combinations thereof.

The message and an indication of the second user input are transferred by wireless device 101 to wireless network 103 (step 204). The indication of the second user input may be transferred as part of header information in the message, as a separate message, within wireless control signaling, or any other method of transferring such information to a wireless network. The indication may include the criteria for delivery of the message or may include some other type of information, such as a code or bit sequence, from which wireless network 103 can derive the delivery criteria placed on the message.

Based on the indication of the second user input, wireless network 103 does not deliver the message to wireless device 102 if the criteria is satisfied (step 206). To determine whether the criteria is satisfied, wireless network 103 first determines a status of wireless device 102. Wireless network 103 may be able to determine the status itself or may query wireless device 102 for the status. For example, if the status includes a location of wireless device 102, then wireless network 103 may determine the location based on an access node that wireless device 102 is using to access wireless network 103. Alternatively, wireless network 103 may query wireless device 102 for the location of wireless device 102, which may provide a more precise GPS location of wireless device 102. Wireless network 102 may determine the status of wireless device 102 periodically, continually, or upon receipt of the indication of the second user input. Similarly, if wireless device 102 provides status information to wireless network 103, then wireless device 102 may provide that status information to wireless network 103 periodically, continually, whenever the status information changes, or upon receipt of a query for the status information from wireless network 103.

If the status of wireless device 102 does not satisfy the criteria, then wireless network 103 will deliver the message to wireless device 102. In some embodiments, if the status of wireless device 102 meets the criteria initially, wireless network 103 may continue to determine the status of wireless device 102 and deliver the message when the status of wireless device 102 no longer satisfies the criteria. Furthermore, the user of wireless device 101 may indicate in the second user input whether the user desires for wireless network 103 to attempt delivery of the message if the status of wireless device 102 initially meets the criteria for non-delivery. Likewise, the user of wireless device 101 may indicate an amount of time or a time of day when wireless network 103 should discontinue any attempt to deliver the message to wireless device 102.

Referring back to FIG. 1, wireless communication devices 101 and 102 each comprises Radio Frequency (RF) communication circuitry and an antenna. The RF communication circuitry typically includes an amplifier, filter, modulator, and signal processing circuitry. Wireless communication devices 101 and 102 may each also include a user interface, memory device, software, processing circuitry, or some other communication components. Wireless communication devices 101 and 102 may each be a telephone, computer, e-book, mobile Internet appliance, wireless network interface card, media player, game console, or some other wireless communication apparatus—including combinations thereof.

Wireless communication network 103 comprises network elements that provide communications services to wireless devices 101 and 102 through wireless access nodes. Wireless communication network 103 may comprise switches, wireless access nodes, Internet routers, network gateways, application servers, computer systems, communication links, or some other type of communication equipment—including combinations thereof.

Wireless links 111 and 112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 3:
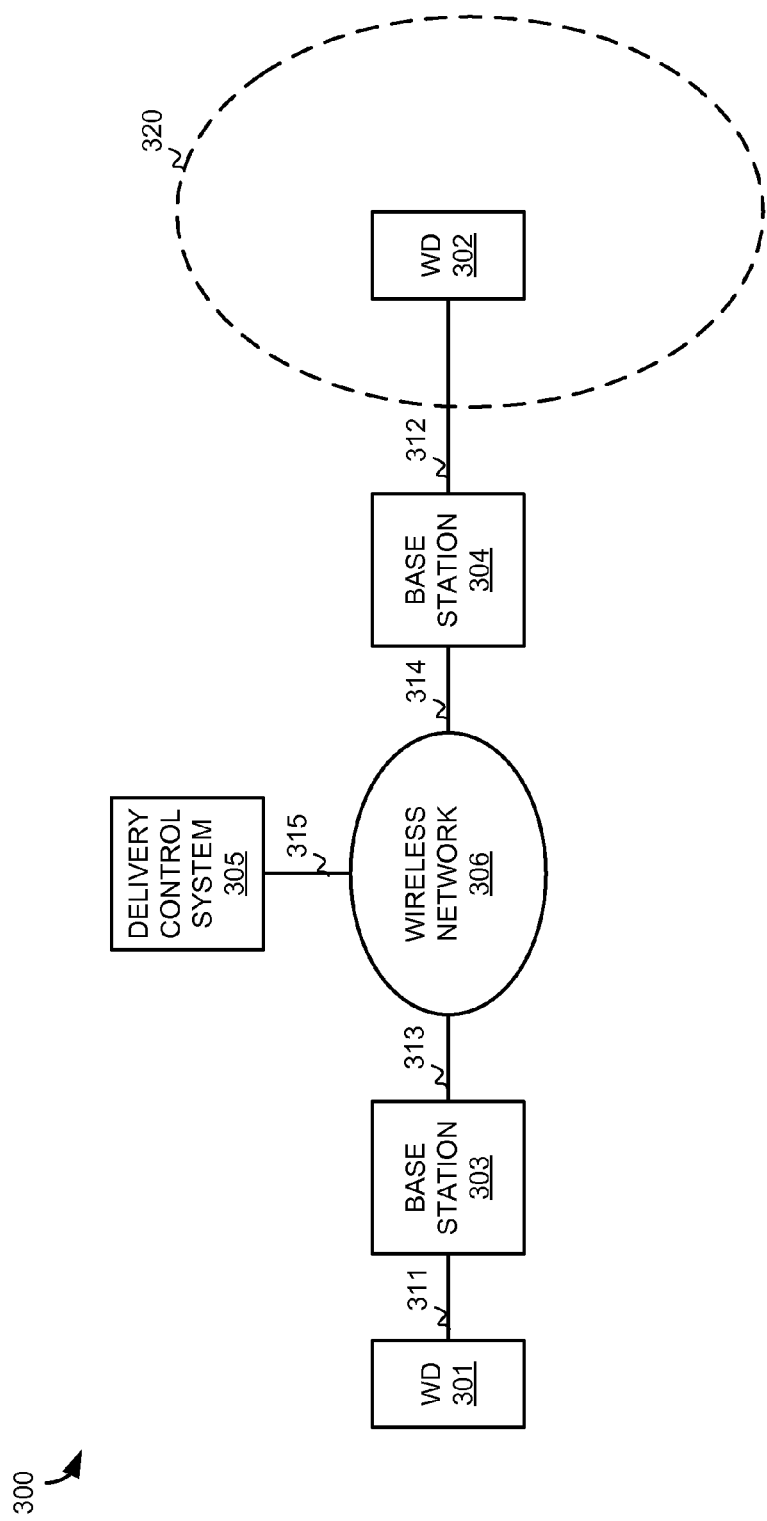
FIG. 3 illustrates a wireless communication system for delivery of a message based on a status of a receiving device.

FIG. 3 illustrates wireless communication system 300. Wireless communication system 300 includes wireless communication device 301, wireless communication device 302, wireless base station 303, wireless base station 304, delivery control system 305, and wireless communication network 306. Wireless communication device 301 and base station 303 communicate over wireless link 311. Wireless communication device 302 and base station 304 communicate over wireless link 312. Wireless base station 303 and wireless communication network 306 communicate over communication link 313. Wireless base station 304 and wireless communication network 306 communicate over communication link 314. Delivery control system 305 and wireless communication network 306 communicate over communication link 315.

Wireless base stations 303 and 304 each comprise RF communication circuitry and an antenna. The RF communication circuitry typically includes an amplifier, filter, RF modulator, and signal processing circuitry. Wireless base stations 303 and 304 may each also comprise a router, server, memory device, software, processing circuitry, cabling, power supply, network communication interface, structural support, or some other communication apparatus.

Delivery control system 305 comprises a computer system and communication interface. Delivery control system 305 may also include other components such a router, server, data storage system, and power supply. Delivery control system 305 may reside in a single device or may be distributed across multiple devices. Delivery control system 305 is shown externally to base stations 303, 304, and wireless network 306, but system 305 could be integrated within the components of base stations 303, 304, and/or wireless network 306. Delivery control system 305 could be a mobile switching center, network gateway system, Internet access node, application server, service node, or some other communication system—including combinations thereof.

Communication links 313-315 use metal, glass, air, space, or some other material as the transport media. Communication links 313-315 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 313-315 could be a direct links or may include intermediate networks, systems, or devices.

Figure 4:
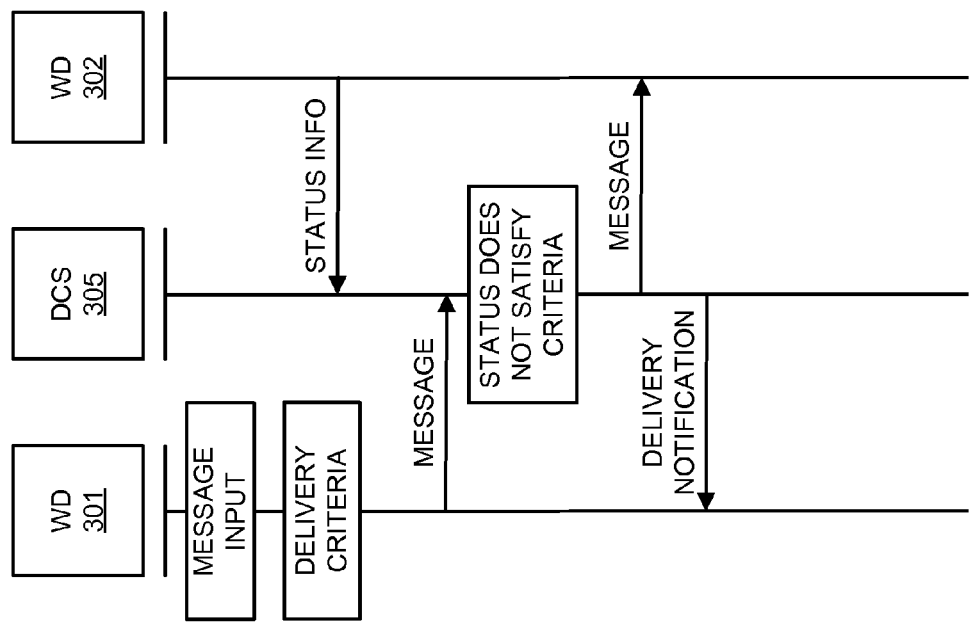
FIG. 4 illustrates an operation of the wireless communication system for delivery of a message based on a status of a receiving device.

FIG. 4 is a sequence diagram illustrating an operation of wireless communication system 300 for delivery of a message based on a status of a receiving device. In this embodiment, wireless device 301 receives input from a user indicating a message for transfer to wireless device 302. The input may be for any type of message, text, audio, video, or otherwise that can be sent over a messaging platform. The message input further indicates wireless device 302 as the destination.

The user of wireless device 301 further enters delivery criteria for the message. The delivery criteria indicates conditions under which the message should not be delivered to wireless device 302. The criteria may be entered in response to a prompt from wireless device 301 or by the user's own accord. In this embodiment, the user of wireless device 301 indicates a criteria that provides that the message should not be delivered if wireless device 302 is exceeding 15 miles per hour (MPH) because at speeds above 15 MPH the user of wireless device may be driving a vehicle.

The message and the delivery criteria are then transferred to delivery control system 305. Upon receiving the message and delivery criteria, delivery control system 305 determines whether the status of wireless device 302 satisfies the delivery criteria. In this embodiment, wireless device 302 transfers status information to delivery control system 305. The status information includes the speed of wireless device 302 and may include other types of status information. The status information may be transferred in response to a query from delivery control system 305, may be transferred periodically, continually, or upon a status condition changing in wireless device 302.

In this embodiment, delivery control system 305 determines that the status of wireless device 302 does not satisfy the criteria placed on the message. In other words, delivery control system 305 determines that the status of wireless device 302 indicates that wireless device 302 is not exceeding 15 MPH. Accordingly, delivery control system 305 delivers the message to wireless device 302. Delivery control system 305 also transfers a delivery notification back to wireless device 301 indicating that the delivery criteria was not met by the status of wireless device 302 and the message was delivered. Wireless device 301 then provides an indication of the delivery notification to the user of wireless device 301.

Figure 5:
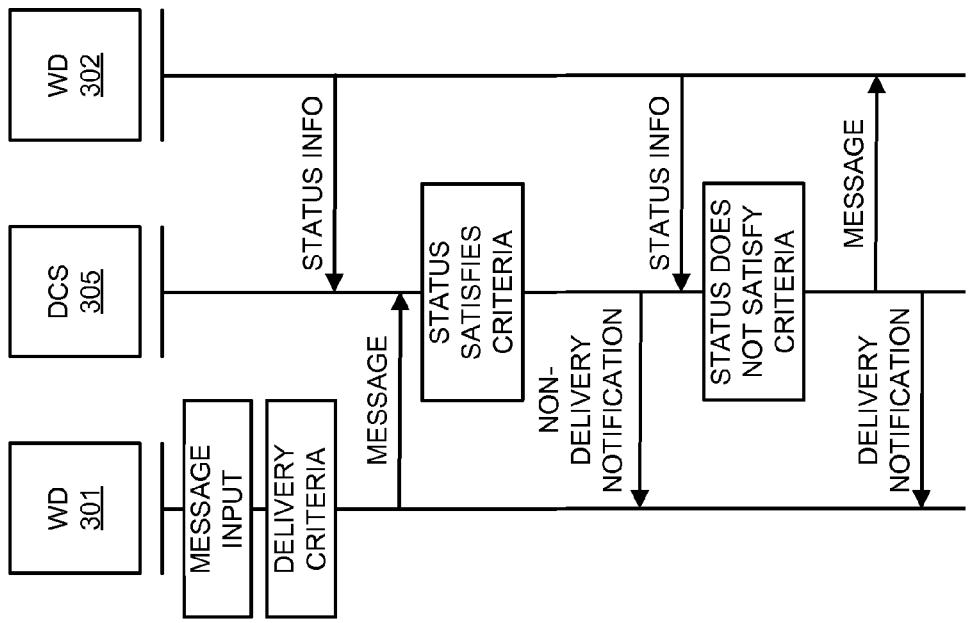
FIG. 5 illustrates an operation of the wireless communication system for delivery of a message based on a status of a receiving device.

FIG. 5 is a sequence diagram illustrating another operation of wireless communication system 300 for delivery of a message based on a status of a receiving device. In this embodiment, wireless device 301 receives input from a user indicating a message for transfer to wireless device 302. The input may be for any type of message, text, audio, video, or otherwise that can be sent over a messaging platform. The message input further indicates wireless device 302 as the destination.

The user of wireless device 301 further enters delivery criteria for the message. The delivery criteria indicates conditions under which the message should not be delivered to wireless device 302. The criteria may be entered in response to a prompt from wireless device 301 or by the user's own accord. In this embodiment, the user of wireless device 301 indicates criteria that provides that the message should not be delivered if wireless device 302 is exceeding 15 MPH and not within location 320. Though shown as an oval in FIG. 3, location 320 may be defined in any way, may take any shape in two or three dimensions, and may be defined in separate parts. Location 320 may be a generic location, such as a city, or more specific coordinates and/or boundaries. In this example, location 320 corresponds to the area around a commuter train route. Therefore, according to the criteria, even if wireless device 302 is exceeding 15 MPH, the message should still be delivered if wireless device 302 is within the train route.

The message and the delivery criteria are then transferred to delivery control system 305. Upon receiving the message and delivery criteria, delivery control system 305 determines whether the status of wireless device 302 satisfies the delivery criteria. In this embodiment, wireless device 302 transfers status information to delivery control system 305. The status information includes the speed of wireless device 302 and location of wireless device 302 and may also include other types of status information. The status information may be transferred in response to a query from delivery control system 305, may be transferred periodically, continually, or upon a status condition changing in wireless device 302.

In this embodiment, delivery control system 305 determines that the status of wireless device 302 satisfies the criteria placed on the message. In other words, delivery control system 305 determines that the status of wireless device 302 indicates that wireless device 302 is exceeding 15 MPH and is not located within location 320. Accordingly, delivery control system 305 does not deliver the message to wireless device 302. Delivery control system 305 notifies wireless device 301 of the non-delivery and wireless device 301 presents the notification to the user of wireless device 301.

Delivery control system 305 continues to receive status updates from wireless device 302. The status information may be transferred in response to a periodic query from delivery control system 305 seeking to determine whether the status of wireless device 302 no longer satisfies the criteria or may be transferred from wireless device 302 periodically, continually, or upon a status condition changing in wireless device 302.

Upon receiving status information from wireless device 302 that no longer satisfies the criteria, delivery control system 305 delivers the message to wireless device 302. Delivery control system 305 also transfers a delivery notification back to wireless device 301 indicating that the criteria was no longer satisfied by the status of wireless device 302 and the message was delivered. Wireless device 301 then provides an indication of the delivery notification to the user of wireless device 301.

It should be understood that the methods taught above may further be applied to multiple devices receiving the message. Accordingly, wireless device 301 may receive notifications about which of the multiple devices received the message and which of the devices satisfied the criteria for the message not to be delivered.

Figure 6:
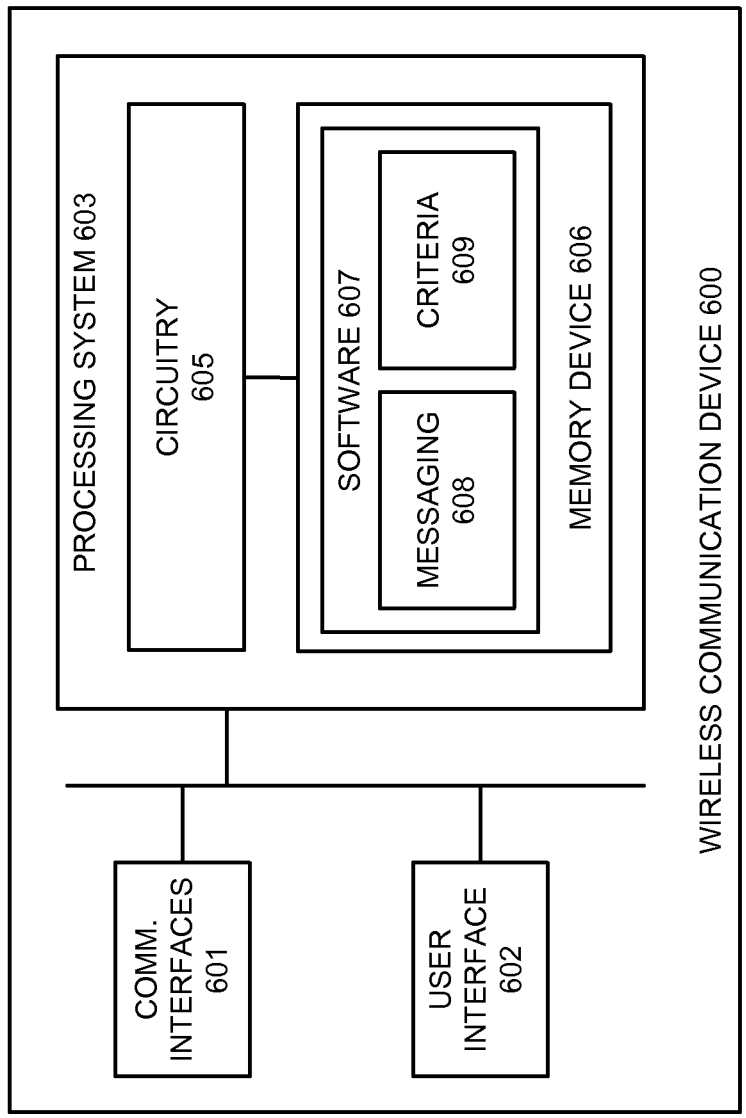
FIG. 6 illustrates a wireless communication device for delivery of a message based on a status of a receiving device.

FIG. 6 illustrates wireless communication device 600. Wireless communication device 600 is an example of wireless communication devices 101 or 301, although devices 101 and 301 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes messaging module 608 and criteria module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, messaging module 608 directs processing system 603 to receive via user interface 602 first user input from a user indicating a message for transmission to a second wireless communication device. Criteria module 609 directs processing system 603 to receive via user interface 602 second user input from the user indicating that the message should not be delivered to the second wireless communication device when a status of the second wireless communication device satisfies a criteria. Operating software 607 directs processing system 603 to transfer via communication interfaces 601 the message and an indication of the second user input to a wireless communication network, wherein, based on the indication of the second user input, the wireless communication network does not deliver the message to the second wireless communication device if the criteria is satisfied.

Figure 7:
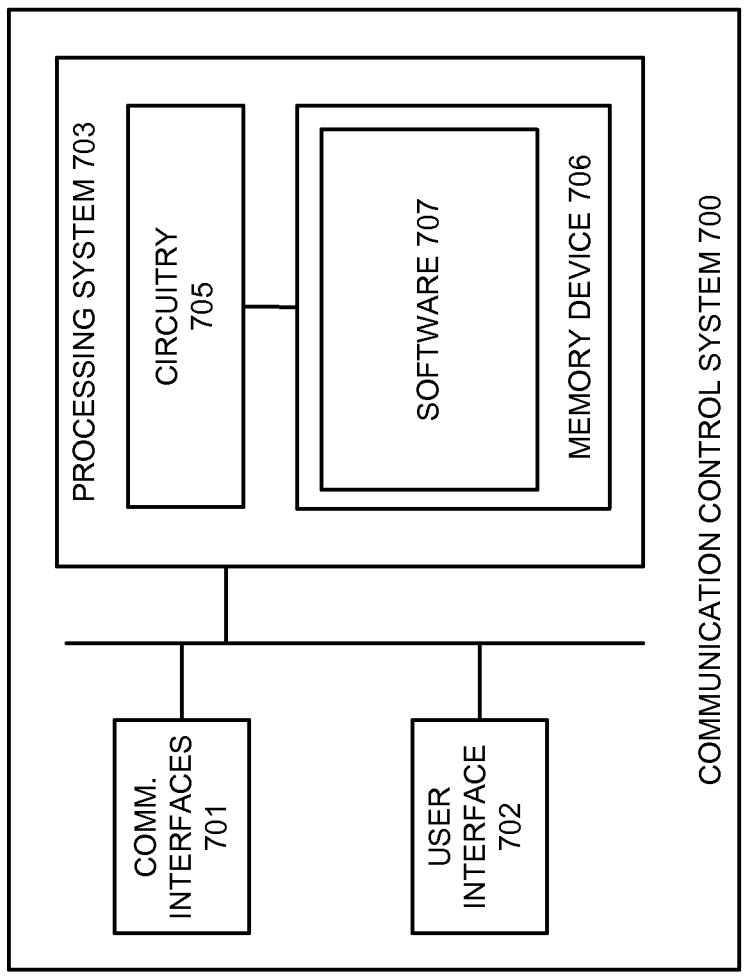
FIG. 7 illustrates a communication control system for delivery of a message based on a status of a receiving device.

FIG. 7 illustrates communication control system 700. Communication control system 700 is an example of delivery control system 305, although control system 305 may use alternative configurations. Communication control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate communication control system 700 as described herein.

In particular, operating software 707 directs processing system 703 to receive from a wireless communication device a message and an indication of second user input from the user indicating that the message should not be delivered to a second wireless communication device when a status of the second wireless communication device satisfies a criteria. Operating software 707 further directs processing system 703 to determine whether the criteria in the indication of the second user input is satisfied and not to deliver the message to the second wireless communication device if the criteria is satisfied.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   in a first wireless communication device, receiving first user input from a user indicating a message for transmission to a second wireless communication device;
   receiving second user input from the user indicating that the message should not be delivered to the second wireless communication device when a status of the second wireless communication device satisfies a criteria, wherein the criteria comprises at least one type of application in use on the second wireless communication device and wherein the criteria is satisfied when the status of the second wireless communication device indicates one or more of the at least one type of application; and
   transferring the message and an indication of the second user input to a wireless communication network, wherein, based on the indication of the second user input, the wireless communication network does not deliver the message to the second wireless communication device if the criteria is satisfied.

2. The method of claim 1, wherein the first user input further indicates the message for transmission to a plurality of wireless devices including the second wireless communication device and the indication of the second user input is used by the wireless communication network to determine whether to deliver the message to each of the plurality of wireless devices, and the method further comprising:
receiving a notification from the wireless communication network indicating to which of the plurality of wireless devices the message was delivered.

3. The method of claim 1, further comprising:
in response to receiving third user input from the user indicating that the message is ready for transfer, indicating to the user that the second wireless communication device satisfies the criteria occurs.

4. The method of claim 3, further comprising:
receiving an indication from the wireless communication network that the second wireless communication device satisfies the criteria.

5. The method of claim 4, further comprising:
in the wireless communication network, delivering the message to the second wireless communication device when the second wireless communication device no longer satisfies the criteria and transferring a notification to the first wireless communication device indicating that the message was delivered; and
in the first wireless communication device, indicating to the user that the message was delivered.

6. The method of claim 1, wherein the criteria comprises a speed threshold and the criteria is satisfied if the status of the second wireless communication device indicates that the second wireless communication device is exceeding the speed threshold.

7. The method of claim 1, wherein the criteria comprises one or more locations and the criteria is satisfied if the status of the second wireless communication device indicates that the second wireless communication device is located within one of the one or more locations.

8. The method of claim 1, further comprising:
in the wireless communication network, receiving the status of the second wireless communication device.

9. The method of claim 1, further comprising:
in the first wireless communication device, receiving a notification of the status of the second wireless communication device and indicating the status to the user.

10. The method of claim 1, wherein the second user input either indicates that the message should not be delivered if the criteria is satisfied or indicates that the message should be delivered once the criteria is no longer satisfied.

11. A wireless communication system, comprising:
a first wireless communication device configured to receive first user input from a user indicating a message for transmission to a second wireless communication device, receive second user input from the user indicating that the message should not be delivered to the second wireless communication device when a status of the second wireless communication device satisfies a criteria, wherein the criteria comprises at least one type of application in use on the second wireless communication device and wherein the criteria is satisfied when the status of the second wireless communication device indicates one or more of the at least one type of application, and transfer the message and an indication of the second user input to a wireless communication network;
the wireless communication network configured to, based on the indication of the second user input, not deliver the message to the second wireless communication device if the criteria is satisfied.

12. The wireless communication system of claim 11, wherein the first user input further indicates the message for transmission to a plurality of wireless devices including the second wireless communication device and the indication of the second user input is used by the wireless communication network to determine whether to deliver the message to each of the plurality of wireless devices, and the wireless communication system further comprising:
the first wireless communication device configured to receive a notification from the wireless communication network indicating to which of the plurality of wireless devices the message was delivered.

13. The wireless communication system of claim 11, further comprising:
the first wireless communication device configured to receive third user input from the user indicating that the message is ready for transfer and, in response to receiving the third user input, indicate to the user that the second wireless communication device satisfies the criteria occurs in response to the third user input.

14. The wireless communication system of claim 13, further comprising:
the first wireless communication device configured to receive an indication from the wireless communication network that the second wireless communication device satisfies the criteria.

15. The wireless communication system of claim 14, further comprising:
the wireless communication network configured to deliver the message to the second wireless communication device when the second wireless communication device no longer satisfies the criteria and transfer a notification to the first wireless communication device indicating that the message was delivered; and
the first wireless communication device configured to indicate to the user that the message was delivered.

16. The wireless communication system of claim 11, wherein the criteria comprises a speed threshold and the criteria is satisfied if the status of the second wireless communication device indicates that the second wireless communication device is exceeding the speed threshold.

17. The wireless communication system of claim 11, wherein the criteria comprises one or more locations and the criteria is satisfied if the status of the second wireless communication device indicates that the second wireless communication device is located within one of the one or more locations.

18. The wireless communication system of claim 11, further comprising:
the wireless communication network configured to receive the status of the second wireless communication device.

19. The wireless communication system of claim 11, further comprising:
the first wireless communication device configured to receive a notification of the status of the second wireless communication device and indicating the status to the user.

20. The wireless communication system of claim 11, wherein the second user input either indicates that the message should not be delivered if the criteria is satisfied or indicates that the message should be delivered once the criteria is no longer satisfied.

* * * * *